Patented Sept. 17, 1935

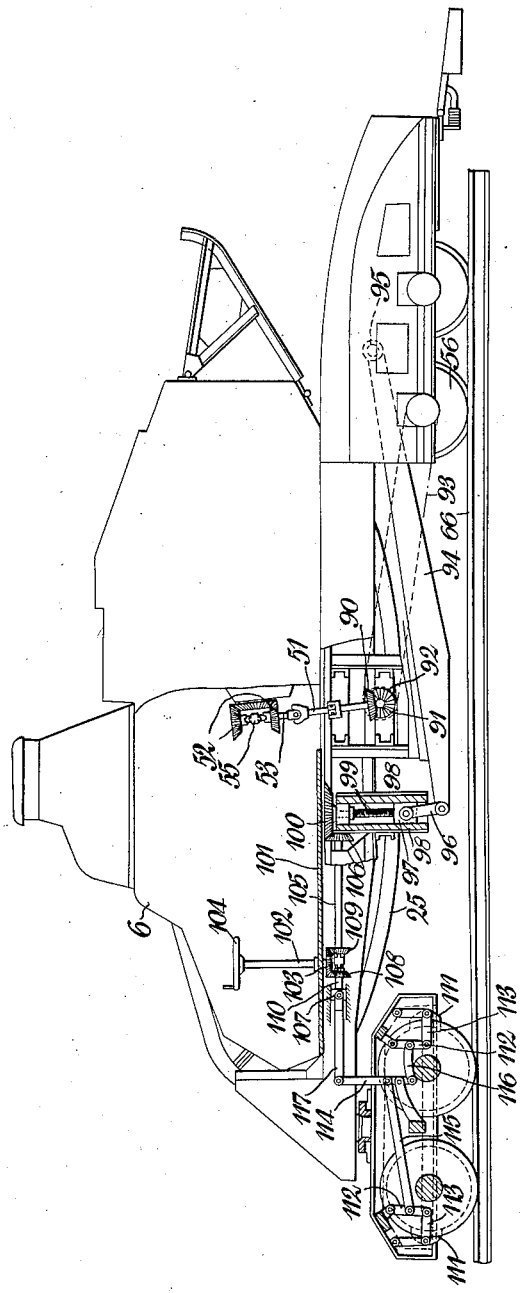

2,014,769

UNITED STATES PATENT OFFICE 2,014,769

CARRIAGE FOR TRANSPORTING ENDLESS-TRACK VEHICLES ON ROADS AND RAILWAY TRACKS

Tadeusz Kossakowski, Warsaw, Poland

Application April 24, 1933, Serial No. 667,717
In Germany February 22, 1933

1 Claim. (Cl. 105—159)

The subject of the present invention is a carriage for transporting endless-track vehicles, which is provided with driving means connecting the road or track wheels of the carriage with the driving mechanism of the endless-track vehicle loaded upon it. The carriage is also provided with means for bringing the steering mechanism of the endless-track vehicle into operative connection with the swivels of the steering wheels of the carriage.

The carriage according to the invention can be constructed to travel on roads as well as on railway rails and is fitted with a platform or platforms secured to it, upon which the endless-track vehicle travels up on to the carriage under its own power.

The vehicle according to this invention may, in accordance with its type of construction, be provided with movable platforms or other supporting members which support the body of the endless track vehicle and which are designed to raise the vehicle to such an extent that the endless-tracks may be removed in order to enable the toothed driving wheels of the tracks to be brought into operative connection by means of chains with the driving mechanism of the carriage. According to another constructional form, the carriage is provided with rollers which are connected to its sprocket wheels by means of chains and which are driven by means of the tracks of the vehicle loaded upon the carriage. According to a further constructional form, the mechanism which connects the road or track wheels of the carriage to the motor of the vehicle loaded upon it includes a telescopic Cardan shaft which can be connected up by means of bevel wheels to the shaft which projects out of the change speed gear box of the driving mechanism of the endless-track vehicle. The change speed gear in such cases must be disconnected from the other driving members of the endless-track vehicle which transmit the drive to the tracks, in order that the latter, during the travel of the carriage with the endless-track vehicle loaded upon it, may remain stationary.

The subject of the invention is illustrated diagrammatically in the accompanying drawing which shows a carriage in the form of a railway vehicle and a battle tank loaded upon it.

Referring to the drawing, the carriage is provided with railway track wheels 56 and the driving mechanism of the carriage is connected up to a shaft which extends out of the change speed gear of the tank. On the end of the Cardan shaft 51, the upper part of which is capable of being pushed apart telescopically from the lower part which is mounted permanently on the carriage, is situated a bevel gear wheel 90 which through the intermediary of the bevel gear wheel 91 drives the sprocket wheel 92 and the latter transmits the drive to the track wheels 56 through the chain 93.

The shaft 51 is at the upper end connected by means of the Cardan coupling with the shaft 53 which is provided with two bevel gear wheels 52. The bevel gear wheels 52 mesh with the gear wheel 54 of the shaft which projects out of the change speed gear of the driving mechanism of the tank. When one of the gear wheels 52 is coupled up with the shaft 53 by means of the coupling 55 provided on the shaft, the carriage together with the tank loaded upon it travels forward; on the other hand if the second gear wheel 52 is coupled up to the shaft the carriage travels rearwardly.

When the tank travels up on to the carriage under its own power, the endless tracks 25 are supported on the beams 94 which at one end are rotatable on the pivots 95. The other ends of the beams 94 are articulated by means of connecting members 96 to the raising member 97 which is constructed in the form of a screw nut and is movable in the guides 98 which are secured to the frame of the carriage. The screw spindle 99 passes through the raising member 97, said screw spindle being immovable in the axial direction and being provided with a bevel gear wheel 100. A vertical shaft 102 is fitted in the platform 101 of the carriage, said shaft being provided at its lower end with a bevel wheel 103 and at its upper end with a crank or hand wheel 104 accessible from inside of the tank housing. Below the platform 101 is situated the horizontal shaft 105 which at one end has bevel gear wheel 106 secured to it and at the other end is fitted with a slidable gear wheel 109. Co-axial with the shaft 105 is situated a shaft 110 provided with a screw thread which is fitted into a slide member 107 constructed as a nut.

By coupling the gear wheel 109 with the gear wheel 103, the hand wheel 104 is brought into operative connection with the mechanism for raising or rocking the beams 94 in order to secure the endless-track vehicle upon the frame of the carriage, after travelling on to it, by lowering the endless track vehicle.

By coupling the gear wheel 108 to the wheel 103, the hand wheel 104 is brought into operative connection with the braking mechanism of the carriage. The braking mechanism comprises the brake blocks 111, which are connected up by the levers 112 to the rods 113, and the two-armed lever 114 which by means of the rods 115 and 116 is connected up to the levers 112 and by means of the rod 117 of the slide member 107.

What I claim is:

The combination of a battle tank having a driving motor and driving mechanism operatively connected to the driving motor with a carriage for supporting the tank, said carriage comprising a frame having supporting wheels and driving means for said wheels, including a driving member arranged for connection with the driving mechanism of the tank from inside the tank, securing means on the carriage arranged thereon for engaging the tank to secure it to the carriage and actuating means for said securing means arranged for operation from inside the tank so as to enable the tank to be secured to the carriage without any of the crew of the tank having to leave the interior of the tank.

TADEUSZ KOSSAKOWSKI.